United States Patent
Xu et al.

(10) Patent No.: US 12,199,352 B2
(45) Date of Patent: Jan. 14, 2025

(54) TUNING CIRCUIT AND COMMUNICATION DEVICE

(71) Applicant: ANHUI ANUKI TECHNOLOGIES CO., LTD., Anhui (CN)

(72) Inventors: Lei Xu, Anhui (CN); Chengjie Zuo, Anhui (CN); Jun He, Anhui (CN)

(73) Assignee: ANHUI ANUKI TECHNOLOGIES CO., LTD., Anhui (CN)

( * ) Notice: Subject to any disclaimer, the term of this patent is extended or adjusted under 35 U.S.C. 154(b) by 183 days.

(21) Appl. No.: 18/025,581

(22) PCT Filed: May 10, 2022

(86) PCT No.: PCT/CN2022/091931
§ 371 (c)(1),
(2) Date: Mar. 9, 2023

(87) PCT Pub. No.: WO2022/262478
PCT Pub. Date: Dec. 22, 2022

(65) Prior Publication Data
US 2023/0335904 A1    Oct. 19, 2023

(30) Foreign Application Priority Data

Jun. 18, 2021  (CN) .......................... 202110678738.3

(51) Int. Cl.
*H01Q 1/22*  (2006.01)
*H01Q 1/48*  (2006.01)
*H01Q 5/328*  (2015.01)

(52) U.S. Cl.
CPC .................. *H01Q 5/328* (2015.01)

(58) Field of Classification Search
CPC ............ H01Q 5/328; H01Q 1/22; H01Q 1/48; H01Q 9/0442
See application file for complete search history.

(56) References Cited

FOREIGN PATENT DOCUMENTS

| CN | 108183331 A | * | 6/2018 | ............. H01Q 1/242 |
| CN | 110198175 A | * | 9/2019 | ............. H01Q 5/335 |
| CN | 113422619 A |   | 9/2021 | |

OTHER PUBLICATIONS

First Office Action issued in related Chinese Application No. 2021106787383, by the State Intellectual Property Office of People's Republic of China on Feb. 9, 2022 in 9 pages.

(Continued)

*Primary Examiner* — Hoang V Nguyen
(74) *Attorney, Agent, or Firm* — Davis Wright Tremaine LLP (57) ABSTRACT

Provided are tuning circuit and communication device. The tuning circuit includes tuning switch, ground patch point, and at least two sets of patch units. Each set of patch units at least includes a first patch point and a second patch point; the tuning switch comprises a standard port and at least one conversion port, and each set of patch units is connected to the corresponding conversion port; a first end of a first patch point and a first end of a second patch point in the same set of patch units are connected to the same conversion port; second ends of first patch points in different patch units are respectively connected to different contact points of an antenna; the second ends of all the second patch points are connected to the ground; and both ends of the ground patch point are respectively connected to the standard port and the ground.

20 Claims, 6 Drawing Sheets

(56) References Cited

OTHER PUBLICATIONS

International Search Report issued in related PCT Application No. PCT/CN2022/091931, on Jul. 27, 2022, in 6 pages.
Patent Search performed in related Chinese Application No. 2021106787383, in 2 pages.
Supplemental Search performed in related Chinese Application No. 2021106787383, in 2 pages.
Written Opinion issued in related PCT Application No. PCT/CN2022/091931, on Jul. 22, 2022, in 5 pages.

* cited by examiner

TUNING CIRCUIT AND COMMUNICATION DEVICE

CROSS-REFERENCE TO RELATED APPLICATIONS

The present disclosure is a 371 U.S. National Phase of International Patent Application No. PCT/CN2022/091931, filed May 10, 2022, entitled "TUNING CIRCUIT AND COMMUNICATION DEVICE," which claims priority to Chinese Application No. 202110678738.3, filed on Jun. 18, 2021, the contents of which are incorporated herein by reference in their entirety.

TECHNICAL FIELD

The present disclosure relates to the field of electronic products, and in particular, to a tuning circuit and a communication device.

BACKGROUND ART

With development of the 5th-generation mobile communication technology (5G), electronic equipment needs to meet requirements of more frequency band radiation. With communication equipment as an example, in order for the communication equipment to meet needs of more frequency band radiation, more and more antenna tuning switches are used for the antenna which is an important part of the communication equipment. Based on this, the size of the antenna and the communication equipment will be affected.

At the same time, people have higher and higher requirements for electronic equipment. For example, miniaturization of electronic devices is required and then, a difficult problem for those skilled in the art is how to make the electronic equipment meet the requirements of more frequency band radiation on the premise of satisfying the miniaturization of the electronic equipment.

SUMMARY

The present disclosure provides a tuning circuit and a communication device to at least partially solve the above problems.

In order to achieve the above purposes, the technical solutions adopted in the embodiments of the present disclosure are as follows.

The embodiment of the present disclosure provides a tuning circuit, the tuning circuit may comprise a tuning switch, a grounded patch point, and at least two groups of patch units, each group of patch units may comprises at least a first patch point and a second patch a patch point, the tuning switch may comprise a standard port and at least one conversion port, and each group of patch units is respectively connected with corresponding conversion ports:

a first end of the first patch point and a first end of the second patch point in a same group of patch units may be connected to a same conversion port:

second ends of first patch points in different patch units may be respectively connected to different contact points in an antenna:

second ends of all the second patch points may be connected to the ground:

two ends of the grounded patch point may be respectively connected with the standard port and the ground; and patch points in a same group of patch units cannot be in an attached state simultaneously.

In a possible implementation manner, the tuning circuit may further comprise an antenna patch point:

one end of the antenna patch point may be connected to one contact point of the antenna; and the other end of the antenna patch point may be connected to the standard port.

In a possible implementation manner, the antenna patch point and the grounded patch point may both be in an attached state:

alternatively, the antenna patch point is in a disconnected state, and the grounded patch point is in an attached state:

alternatively, the antenna patch point is in an attached state, and the grounded patch point is in a disconnected state.

In a possible implementation manner, each group of patch units may further comprise a third patch point:

a first end of the third patch point may be connected to a first end of a first patch point in a same group of patch units; and a second end of the third patch point may be connected to an input feeder.

In a possible implementation manner, the conversion ports may be in number of 3 or 4.

In a possible implementation manner, the conversion ports may be in number same as that of the patch units.

In a possible implementation manner, number of the conversion ports may be greater than that of the patch units.

In a possible implementation manner, the tuning circuit may further comprise a first matching component, a second matching component and a third matching component:

a first end of the first matching component may be connected to the input feeder, and a second end of the first matching component may be connected to an input end of the antenna:

two ends of the second matching component may be respectively connected with a first end of the first matching component and the ground; and two ends of the third matching component may be respectively connected with a second end of the first matching component and the ground.

In a possible implementation manner, the tuning circuit may further comprise a control chip, and the control chip is connected to the tuning switch:

the control chip is configured to send a switching signal to the tuning switch, so that the tuning switch switches a conduction relationship between the standard port and the conversion port.

The embodiment of the present disclosure provides a communication device, which may comprise the tuning circuit mentioned above, wherein the tuning circuit may comprise a tuning switch, a grounded patch point and at least two groups of patch units, each group of patch units comprises at least a first patch point and a second patch point, the tuning switch may comprise one standard port and at least one conversion port, and each group of patch units is respectively connected to a corresponding conversion port:

a first end of a first patch point and a first end of a second patch point in a same group of patch units may be connected to a same conversion port:

second ends of first patch points in different patch units may be respectively connected to different contact points in an antenna:

second ends of all the second patch points may be connected to the ground:

two ends of the grounded patch point are respectively connected with the standard port and the ground; and patch points in a same group of patch units cannot be in an attached state simultaneously.

In a possible implementation manner, each group of patch units may further comprise a third patch point:

a first end of the third patch point may be connected to a first end of a first patch point in a same group of patch units; and a second end of the third patch point may be connected to an input feeder.

With respect to the related art, in a tuning circuit and a communication device provided by embodiments of the present disclosure, the tuning circuit may comprise a tuning switch, a grounded patch point, and at least two groups of patch units, each group of patch units includes at least a first patch point and a second patch point, the tuning switch may comprise one standard port and at least one conversion port, each group of patch units is respectively connected with the corresponding conversion ports: the first end of the first patch point and the first end of the second patch point in the same group of patch units are connected to the same conversion port: the second ends of the first patch points in different patch units are respectively connected to different contact points in the antenna: the second ends of all the second patch points are connected to the ground: the two ends of the grounded patch point are respectively connected to the standard port and the ground; and the patch points in the same group of patch units cannot be in an attached state at the same time. By selecting the closed port of the tuning switch, the conduction of the contact point of the antenna can be switched, or the electrical properties of the antenna ground feeder can be changed, thereby switching the electrical length of the antenna. The tuning switch is used in a variety of applications. In the case of satisfying the above functions, the number of tuning switches is reduced and it is avoided that the size is too large.

In order to make the above-mentioned objects, features and advantages of the present disclosure more understandable, preferred embodiments are exemplified below, and are described in conjunction with drawings in detail as follows.

BRIEF DESCRIPTION OF DRAWINGS

In order to explain the technical solutions of the embodiments of the present disclosure more clearly, the drawings that need to be used in the embodiments will be briefly introduced below. It should be understood that the following drawings only show some of the embodiments of the present disclosure, and therefore should be regarded as a limitation on the scope. For those skilled in the art, other related drawings can also be obtained according to these drawings without any creative efforts.

In the drawings: 101—patch unit.

DETAILED DESCRIPTION OF EMBODIMENTS

In order to make the purposes, technical solutions and advantages of the embodiments of the present disclosure clearer, the technical solutions in the embodiments of the present disclosure will be clearly and completely described below with reference to the drawings in the embodiments of the present disclosure. Obviously, the described embodiments are some, but not all, of the embodiments of the present disclosure. Generally, the components of the disclosed embodiments described and illustrated in the drawings herein may be arranged and designed in a variety of different configurations.

Therefore, the following detailed description of the embodiments of the disclosure provided in the drawings is not intended to limit the scope of the disclosure as claimed, but is merely representative of selected embodiments of the present disclosure. Based on the embodiments in the present disclosure, all other embodiments, which are obtained by those skilled in the art without creative efforts, shall fall within the protection scope of the present disclosure.

It should be noted that similar reference numerals and letters refer to similar items in the following drawings, so that once an item is defined in one drawing, it is not required to further define and explain it in subsequent drawings. Meanwhile, in the description of the present disclosure, the terms, "first", "second", etc., are only used to describe the distinguishing, and cannot be understood as indicating or implying importance of relativity.

It should be noted that, herein, relational terms, such as, first and second, are only used to distinguish one entity or operation from another entity or operation, and do not necessarily require or imply that any actual relationship or sequence exists between these entities or operations. Moreover, the terms, "comprising", "including" or any other variation thereof are intended to encompass a non-exclusive inclusion, such that a process, method, article or device, that comprises a list of elements, comprises not only those elements, but also comprises other elements not explicitly listed or inherent to such a process, method, article or apparatus. Without further limitation, an element qualified by the phrase "comprising a . . . " does not preclude the presence of additional identical elements in a process, method, article or apparatus that comprises this element.

In the description of the present disclosure, it should be noted that the orientation or position relationship indicated by the terms "upper", "lower", "inner", "outer", etc. is based on the orientation or position relationship shown in the drawings, or the orientation or position relationship in which the product of the present application is usually placed in use, which is only for the convenience of describing the present disclosure and simplifying the description, rather than indicating or implying that the referred device or element must be in a specific orientation, or be constructed and operated in a specific orientation, and therefore it should not be construed as a limitation on the present disclosure.

In the description of the present disclosure, it should also be noted that, unless expressly specified and limited otherwise, the terms "provide" and "connect" should be understood in a broad sense. For example, it may be a fixed connection or a detachable connection, or can be connected in one piece: it can be a mechanical connection or an electrical connection: it can be directly connected or indirectly connected through an intermediate medium, and it can be the internal communication between two components. For those skilled in the art, the specific meanings of the above terms in the present disclosure can be understood in specific situations.

Some embodiments of the present disclosure will be described in detail below with reference to the drawings. The embodiments described below and features in the embodiments may be combined with each other without conflict.

Figure 1:
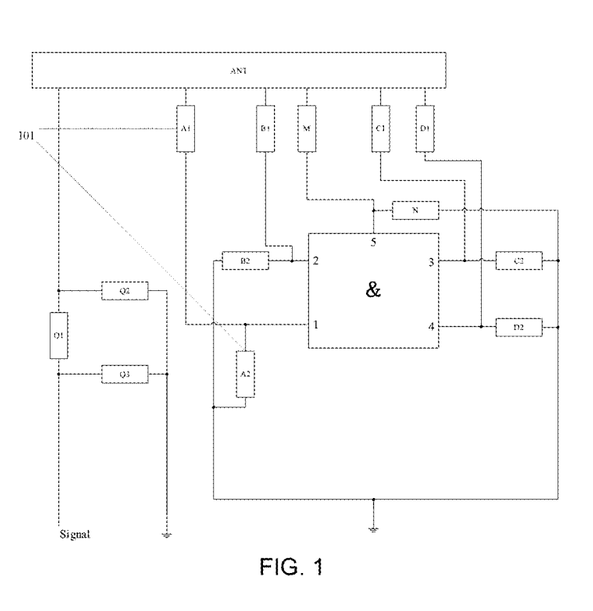
FIG. 1 is a schematic diagram of connection of a tuning circuit provided by an embodiment of the present disclosure.

In order to enable the electronic device to meet the requirements of more frequency band radiation on the premise of satisfying the miniaturization of the electronic device, an embodiment of the present disclosure provides a tuning circuit. As shown in FIG. 1, the tuning circuit may comprise a tuning switch &, a grounded patch point N, and at least two groups of patch units 101. Each group of patch units 101 comprises at least a first patch point and a second patch point. FIG. 1 shows that the patch unit 101 comprises unit A, unit B, unit C, and unit D. The first patch point and the second patch point of unit A are A1 and A2 respectively. Similarly, it can be known that unit B, unit C and unit D correspond to the first patch point and the second patch point.

FIG. 1 shows that the number of the groups of patch units 101 is 4, for ease of reference. It is not limited that the number of the groups of patch units 101 can only be 4, and the number of the groups of patch units 101 can be greater or less than 4.

Continuously referring to FIG. 1, the tuning switch & can comprise one standard port (port 5 in FIG. 1) and at least one conversion port (ports 1 to 4 in FIG. 1). Each group of patch units 101 can be separately connected to the corresponding conversion port. In a possible implementation manner, the number of the conversion ports is the same as the number of the patch units 101. Of course, the number of conversion ports may be greater than the number of patch units 101.

When the number of conversion ports is the same as the number of patch units 101, each port is fully utilized, avoiding waste of ports.

As shown in FIG. 1, unit A, unit B, unit C and unit D are respectively connected to different conversion ports.

Continuously referring to FIG. 1, the first end of the first patch point and the first end of the second patch point in the same group of patch units 101 are connected to the same conversion port.

For example, the first end of A1 and the first end of A2 can both be connected to conversion port 1, the first end of B1 and the first end of B2 can both be connected to conversion port 2, the first end of C1 and the first end of C2 can both be connected to conversion port 3, and the first end of D1 and the first end of D2 can both be connected to conversion port 4.

The second ends of the first patch points in different patch units may be respectively connected to different contact points in the antenna ANT. The second ends of all the second patch points may be connected to the ground.

Continuously referring to FIG. 1, the second end of A1, the second end of B1, the second end of C1, and the second end of D1 are respectively connected to different contact points in the antenna ANT, that is, the patch units 101 of different groups are respectively connected at different contact points. The second end of A2, the second end of B2, the second end of C2, and the second end of D2 are all connected to the ground.

The two ends of the grounded patch point N are respectively connected to the standard port (port 5) and the ground.

The patch points in the same group of patch units cannot be in the attached state at the same time. For example, when A1 is in the attached state, A2 cannot be in the attached state, otherwise the RF signal from A1 will directly be transferred to the ground through A2, and not regulated and controlled by the tuning switch &.

It should be noted that the two ends of the patch unit 101 are solder joints. When the solder joints at both ends of the patch unit 101 are respectively welded to the two ends of a jumper, the patch unit 101 is in an attached state: otherwise, it is in the non-attached and disconnected state, wherein it is equivalent to that two ends thereof are in an open circuit and non-conduction. The jumper can be a structure of resistor, capacitor, inductor or a combination thereof, and can be specifically set according to the applicable scene.

When the patch unit 101 is not patched, it is equivalent that two ends thereof are in an open circuit and are not in conduction. When the first patch point is in a state of being attached, the conduction of the contact point of the antenna can be switched by selecting the closed port of the tuning switch &. When the second patch point is in an attached state, by selecting the closed port of the tuning switch, the electrical properties (resistance, capacitance, inductance, etc.) of the antenna ground feeder can be changed, thereby switching the electrical length of the antenna. In this way, the tuning switch & can be used in a variety of applications. In the case of satisfying the above functions, the number of tuning switches is reduced, avoiding the too large size.

To sum up, the embodiments of the present disclosure provide a tuning circuit. The tuning circuit may comprise a tuning switch, a grounded patch point, and at least two groups of patch units. Each group of patch units includes at least a first patch point and a second patch unit. The tuning switch comprises one standard port and at least one conversion port. Each group of patch units is respectively connected to the corresponding conversion ports. The first end of the first patch point and the first ends of the second patch point in the same group of patch units are connected to the same conversion port. The second ends of the first patch points in different patch units are respectively connected to different contact points in the antenna. The second ends of all the second patch points are connected to the ground. The two ends of the grounded patch point are connected to the standard port and the ground, respectively. The patch points in the same group of patch units cannot be in an attached state at the same time. By selecting the closed port of the tuning switch, the conduction of the contact point of the antenna can be switched, or the electrical properties of the antenna ground feeder can be changed, thereby switching the electrical length of the antenna. Tuning switches are used in a variety of applications. In the case of satisfying the above functions, the number of tuning switches is reduced, avoiding the too large size. Continuously referring to FIG. 1, in order to satisfy a larger tuning range, the embodiment of the present disclosure also provides a possible implementation manner, and the tuning circuit may further comprise an antenna patch point M.

One end of the antenna patch point M is connected to one contact point of the antenna; and the other end of the antenna patch point M is connected to a standard port (port 5).

It should be noted that both the antenna patch point M and the grounded patch point N are in an attached state: or the antenna patch point M is in the disconnected state, and the grounded patch point N is in the attached state: or the antenna patch point M is in the attached state, and the grounded patch point N is in the disconnected state.

Specifically, by setting the antenna patch point M in an attached state, when all the first patch points are in a non-attached state, the antenna patch point M and a certain second patch point are kept in the attached state, and the standard port is connected to the port corresponding to the second patch point in the attached state through the tuning switch &, so that the ground feeder remains conductive.

Figure 2:
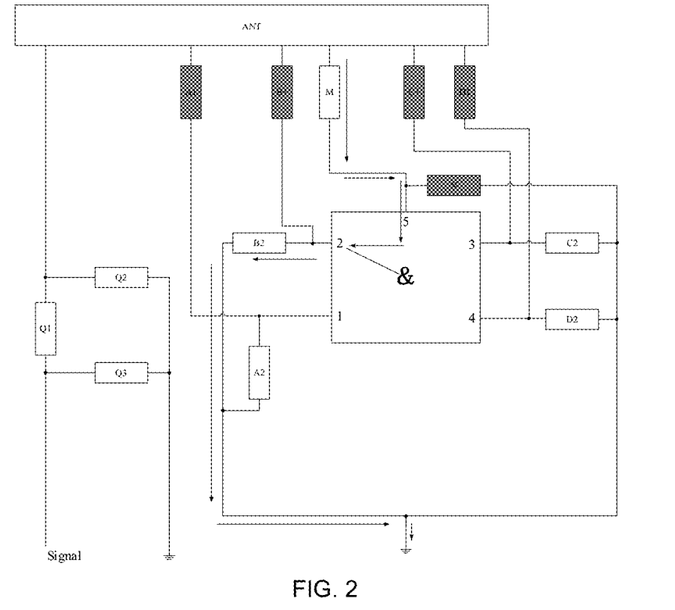
FIG. 2 shows a conduction state according to an embodiment of the present disclosure.

Referring to FIG. 2 to FIG. 5, in FIG. 2, all the first patch points are in the disconnected state, all the second patch points are in the attached state, the antenna patch point M is in the attached state, and the grounded patch point N is in the disconnected state.

The tuning switch & is switched to the conversion port that is connected to the standard port 5, as shown in FIG. 2. The conversion port 2 is connected to the standard port 5, and at this time, the conduction state of the tuning circuit is shown in the direction of the arrow in FIG. 2.

Figure 3:
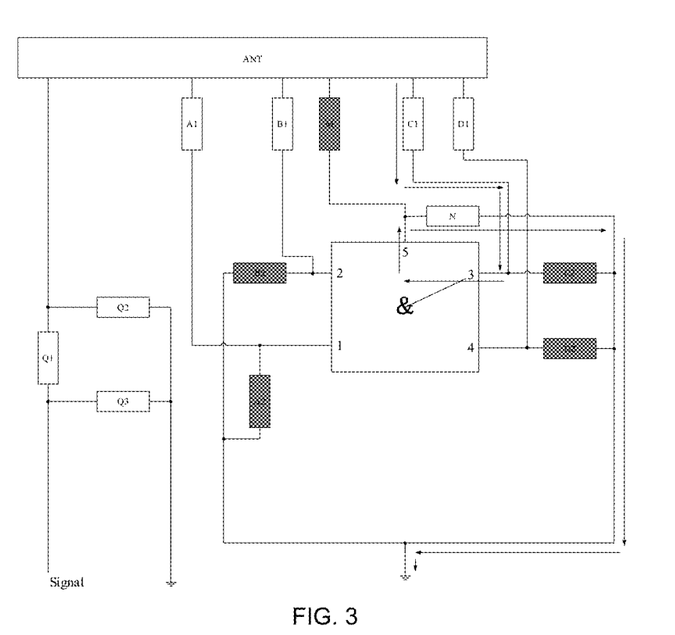
FIG. 3 shows another conduction state according to an embodiment of the present disclosure.

FIG. 3 shows that all the first patch points are in the attached state, all the second patch points are in the disconnected state, the antenna patch point M is in the disconnected state, and the grounded patch point N is in the attached state.

The tuning switch & is switched to the conversion port that is connected to the standard port 5, as shown in FIG. 3. The conversion port 3 is connected to the standard port 5, and at this time, the conduction state of the tuning circuit is shown in the direction of the arrow in FIG. 3.

Figure 4:
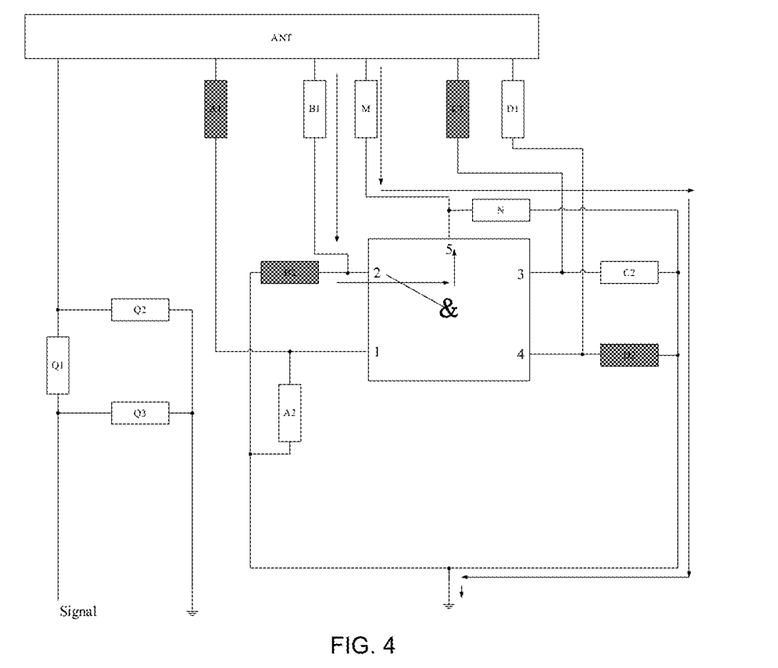
FIG. 4 shows another conduction state according to an embodiment of the present disclosure.
Figure 5:
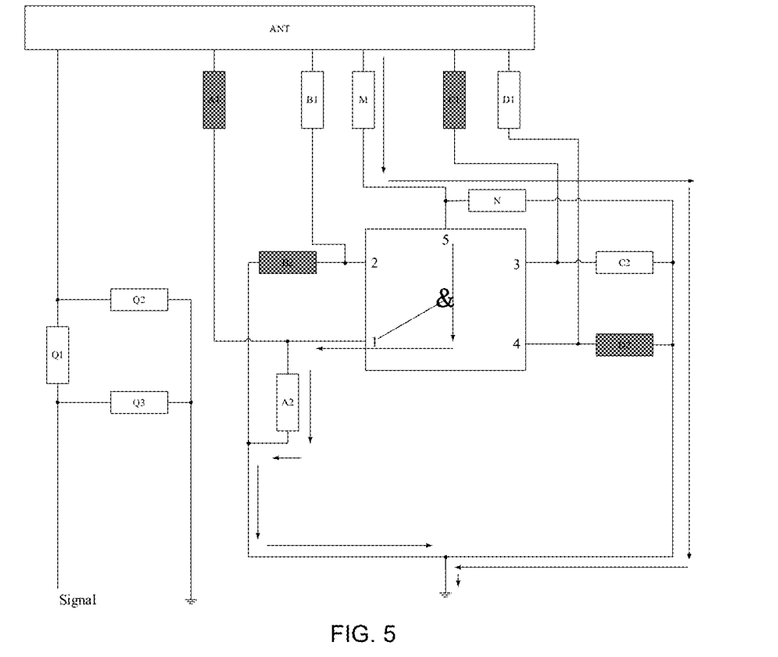
FIG. 5 shows yet another conduction state according to an embodiment of the present disclosure.

In FIGS. 4 and 5, some of the first patch points (B1 and D1) are each in an attached state, some of the first patch points (A1 and C1) are each in a disconnected state, and some of the second patch points (A2 and C2) are each in an attached state, some of the second patch points (B2 and D2) are each in a disconnected state, and the antenna patch point M and the grounded patch point N are both in an attached state.

The tuning switch & is switched to the conversion port that is connected to the standard port 5, as shown in FIG. 4. The conversion port 2 is connected to the standard port 5, and at this time, the conduction state of the tuning circuit is shown in the direction of the arrow in FIG. 4.

As shown in FIG. 5, the conversion port 1 is connected to the standard port 5, and at this time, the conduction state of the tuning circuit is shown in the direction of the arrow in FIG. 5.

It should be noted that when the conduction state of the tuning circuit changes, the electrical length corresponding to the antenna will also change.

Figure 6:
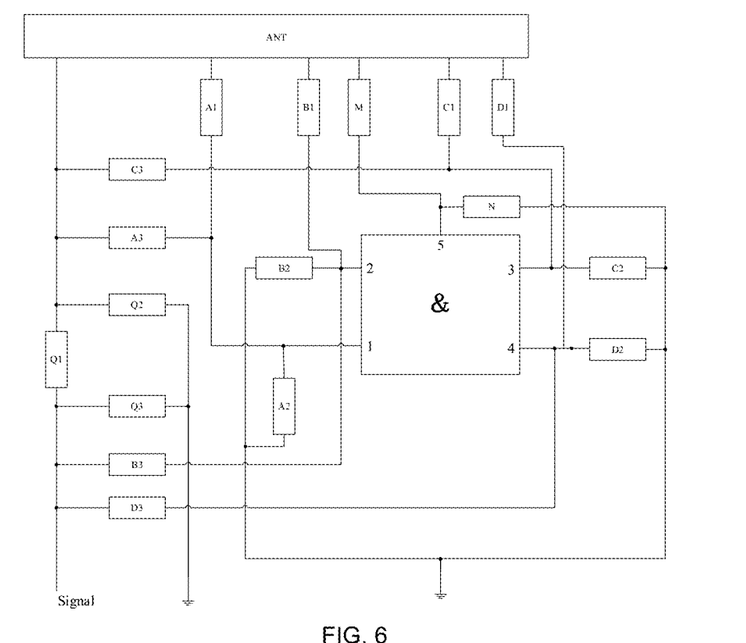
FIG. 6 is a schematic diagram of the connection of another tuning circuit provided by an embodiment of the present disclosure.

On the basis of FIG. 1, regarding how to further realize the impedance matching of the input signal, an embodiment of the present disclosure also provides a possible implementation manner. Referring to FIG. 6, each group of patch units 101 may further comprise a third patch point.

FIG. 6 shows that the patch unit 101 comprises unit A, unit B, unit C and unit D, and the third patch points of unit A, unit B, unit C and unit D are A3, B3, C3 and D3 respectively.

The first end of the third patch point is connected to the first end of the first patch point in the same group of patch units.

For example, the first end of A3 is connected to the first end of A1, and is also connected to the first end of A2, and at the same time, is connected to the conversion port 1.

The second end of the third patch point is connected to the input feeder Signal, that is, the second ends of A3, B3, C3 and D3 are all connected to the input feeder Signal.

Figure 7:
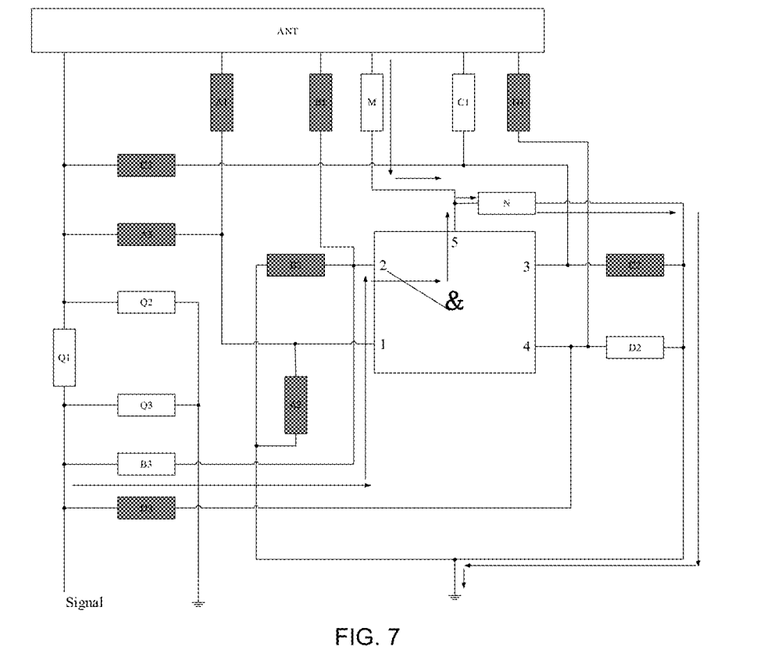
FIG. 7 shows another conduction state according to an embodiment of the present disclosure.

In a possible implementation manner, A3, B3, C3, and D3 can all be in an attached state, and A1, B1, C1, D1, A2, B2, C2, and D2 can all be in a disconnected state. At this time, the tuning switch &, by switching the conversion port that is connected to the standard port 5, can perform the different impedance matching on the input signal. As shown in FIG. 7, the conversion port 2 is connected to the standard port 5, and the conduction state of the tuning circuit is passing through B3, the tuning switch & and the grounded patch point N to reach the ground, and the different impedance matching is performed on the input signal.

FIG. 7 can be referred to, for obtaining the conduction state of the tuning circuit when the standard port 5 is connected to other conversion ports, and A3, B3, C3 and D3 are all in an attached state, which will not be repeated here. FIG. 2 and FIG. 3 can be referred to, for obtaining that the first patch points are each in the attached state or the second patch points are each in the attached state, which will not be repeated here.

In a possible implementation manner, part of the first patch points (C1) may be in an attached state, part of the first patch points (A1, B1 and D1) are each in a disconnected state, part of the second patch points (D2) is in the attached state, part of the second patch points (A2, B2 and C2) are each in the disconnected state, part of the third patch points (B3) is in the attached state, and part of the third patch points (A3, D3, and C3) are each in the disconnected state. The antenna patch point M and the grounded patch point N are both in an attached state. When the tuning switch & is switched to the conversion port that is connected to the standard port 5, there are many different conduction states in the tuning circuit, which can play different functions.

Specifically, Referring to FIG. 7 to FIG. 10, as shown in FIG. 7, the conversion port 2 is connected to the standard port 5. At this time, the conduction state is shown in the direction of the arrow in FIG. 7, which can play the role of impedance matching for the input signal.

Figure 8:
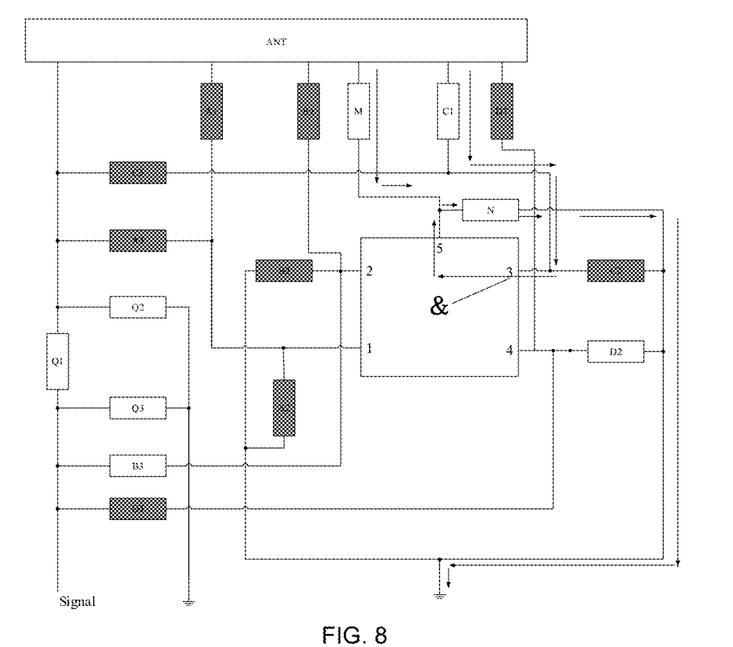
FIG. 8 shows another conduction state according to an embodiment of the present disclosure.

As shown in FIG. 8, the conversion port 3 is connected to the standard port 5. At this time, the conduction state is shown in the direction of the arrow in FIG. 8, and the antenna contact points can be switched (previously, the feed-ground connection is performed by the port corresponding to M, and at present, the feed-ground connection is performed by the ports corresponding to M and C1), and at the same time, the electrical length corresponding to the antenna can be adjusted as well.

Figure 9:
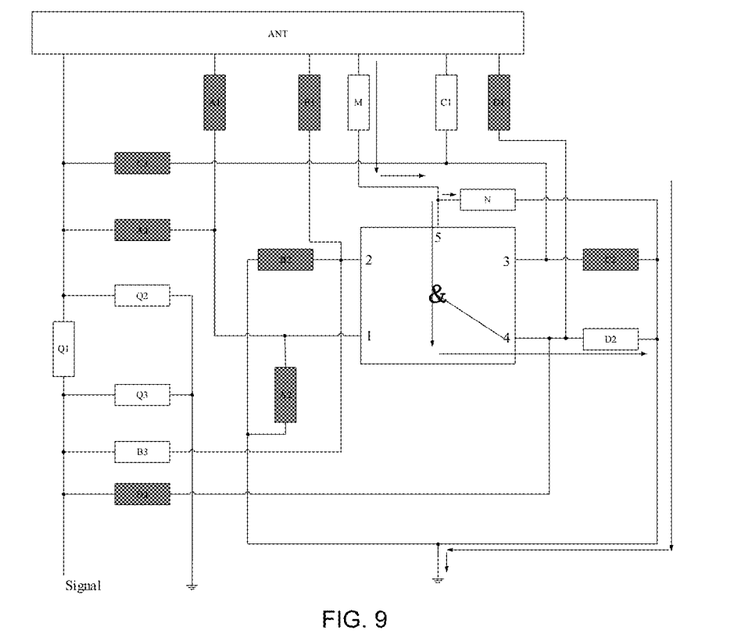
FIG. 9 shows yet another conduction state according to an embodiment of the present disclosure.

As shown in FIG. 9, the conversion port 4 is connected to the standard port 5. At this time, the conduction state is shown in the direction of the arrow in FIG. 9, which can play the role of adjusting the electrical length corresponding to the antenna.

Figure 10:
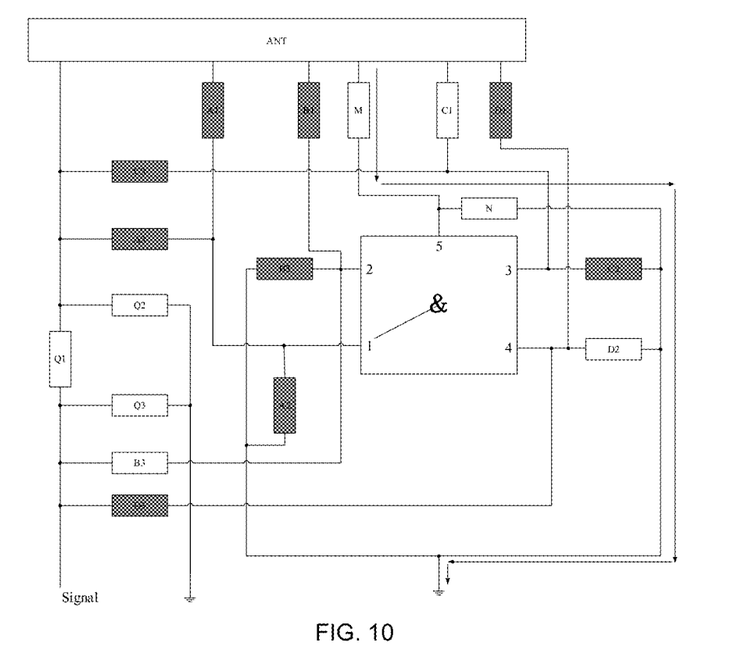
FIG. 10 shows another conduction state according to an embodiment of the present disclosure.

As shown in FIG. 10, the conversion port 1 is connected to the standard port 5. At this time, the conduction state is shown in the direction of the arrow in FIG. 10. The antenna contact point is directly connected to the ground through the default line.

In FIGS. 7 to 10, A1, A2 and A3 are all in a disconnected state. In a possible implementation, one of A1, A2 and A3 may be in an attached state.

It should be noted that, when the antenna patch point M and the grounded patch point N are both in an attached state, different switching capabilities can be achieved by the magnitude of the resistance to the ground. At this time, in each group of patch units 101, there is only one patch point is in an attached state.

In a possible implementation manner, the number of conversion ports may be 3 or 4.

Continuously referring to FIG. 1 or FIG. 6, in a possible implementation manner, the tuning circuit may further comprise a first matching component Q1, a second matching component Q2 and a third matching component Q3.

The first end of the first matching component Q1 is connected to the input feeder, and the second end of the first matching component Q1 is connected to the input end of the antenna ANT.

Two ends of the second matching component Q2 are respectively connected to the first end of the first matching component Q1 and the ground.

Two ends of the third matching component Q3 are respectively connected to the second end of the first matching component Q1 and the ground.

Specifically, by providing the first matching component Q1, the second matching component Q2 and the third matching component Q3, even when any third patch point is not attached, the impedance matching can be performed on the input signal.

In a possible implementation manner, the tuning circuit further comprises a control chip, and the control chip is connected with the tuning switch &.

The control chip is configured to send a switching signal to the tuning switch &, so that the tuning switch & switches the conduction relationship between the standard port and the conversion port.

The embodiment of the present disclosure further provides a communication device, and the communication device may comprise any one of the tuning circuits in the foregoing embodiments. The tuning circuit may comprise a tuning switch, a grounded patch point, and at least two groups of patch units. Each group of patch units may comprises at least a first patch point and a second patch point. The tuning switch may comprise one standard port and at least one conversion port. Each group of patch units is respectively connected to the corresponding conversion ports. The first end of the first patch point and the first end of the second patch point in the same group of patch units can be connected to the same conversion port. The second ends of the first patch points in different patch units can be connected to different contact points in the antenna, respectively. The second ends of all the second patch points can be connected to the ground. Two ends of the grounded patch point can be connected to the standard port and the ground, respectively. The patch points in the same group of patch units cannot be in the attached state at the same time.

Optionally, each group of patch units further comprises a third patch point: the first end of the third patch point is connected to the first end of the first patch point in the same group of patch units; and the second end of the third patch point is connected to the input feeder.

It should be noted that the communication device provided in this embodiment comprises any one of the tuning circuits in the foregoing examples, which can achieve the technical effects corresponding to the tuning circuits. For a brief description, the corresponding content in the above-mentioned embodiments may be referred to, for obtaining the parts not mentioned in this embodiment.

Only preferred embodiments of the present disclosure are described above, and are not intended to limit the present disclosure. For those skilled in the art, the present disclosure may have various modifications and changes. Any modifications, equivalent replacements, improvements, etc. made within the spirit and principle of the present disclosure shall be covered by the protection scope of the present disclosure.

It will be apparent to those skilled in the art that the present disclosure is not limited to the details of the above-described exemplary embodiments. The present disclosure may be embodied in other specific forms without departing from the spirit or essential characteristics of the present disclosure. Therefore, in all respects, the embodiments are to be regarded as illustrative but not restrictive, and the scope of the present disclosure is to be defined by the appended claims rather than the foregoing description. Therefore, it is intended that all changes which come within the meaning and scope of equivalents of the claims fall within the scope of the present disclosure. Any reference numbers in the claims shall not be construed as limiting the involved claim.

INDUSTRIAL APPLICABILITY

The present disclosure provides a tuning circuit and a communication device. The tuning circuit comprises a tuning switch, a grounded patch point and at least two groups of patch units, each group of patch units at least comprises a first patch point and a second patch point. The tuning switch comprises one standard port and at least one conversion port, and each group of patch units is respectively connected with the corresponding conversion ports. The first end of the first patch point and the first end of the second patch point in the same group of patch units are connected to the same conversion port. The second ends of the first patch points in different patch units are respectively connected to different contact points in the antenna. The second ends of all the second patch points are connected to the ground. Two ends of the grounded patch point are connected to the standard port and the ground, respectively. The closed port of the tuning switch is selected to switch the conduction of the contact point of the antenna or change the electrical properties of the antenna ground feeder, so as to switch the electrical length of the antenna, achieving the purpose of one switch for multiple purposes.

Furthermore, it will be appreciated that the tuned circuit and the communication device of the present disclosure are reproducible and can be used in a variety of industrial applications, e.g., in the field of communication technology.

What is claimed is:

1. A tuning circuit, comprising a tuning switch, a grounded patch point and at least two groups of patch units, wherein each group of patch units at least comprises a first patch point and a second patch point, the tuning switch comprises one standard port and at least one conversion port, and each group of patch units is respectively connected with a corresponding conversion port;
   a first end of the first patch point and a first end of the second patch point in a same group of patch units are connected to a same conversion port;
   second ends of first patch points in different patch units are respectively connected to different contact points in an antenna;
   second ends of all second patch points are connected to a ground;
   two ends of the grounded patch point are respectively connected with the standard port and the ground; and
   patch points in a same group of patch units cannot be in an attached state simultaneously.

2. The tuning circuit according to claim 1, wherein the tuning circuit further comprises an antenna patch point; and
   one end of the antenna patch point is connected to one contact point of the antenna; and the other end of the antenna patch point is connected to the standard port.

3. The tuning circuit according to claim 2, wherein the antenna patch point and the grounded patch point are both in an attached state;

alternatively, the antenna patch point is in a disconnected state, and the grounded patch point is in an attached state;

alternatively, the antenna patch point is in an attached state, and the grounded patch point is in a disconnected state.

4. The tuning circuit according to claim 3, wherein each group of patch units further comprises a third patch point;
a first end of the third patch point is connected to a first end of the first patch point in a same group of patch units; and
a second end of the third patch point is connected to an input feeder.

5. The tuning circuit according to claim 3, wherein the tuning circuit further comprises a first matching component, a second matching component and a third matching component;
a first end of the first matching component is connected to an input feeder, and a second end of the first matching component is connected to an input end of the antenna;
two ends of the second matching component are respectively connected with a first end of the first matching component and a ground; and
two ends of the third matching component are respectively connected with a second end of the first matching component and the ground.

6. The tuning circuit according to claim 3, wherein the tuning circuit further comprises a control chip, and the control chip is connected to the tuning switch; and
the control chip is configured to send a switching signal to the tuning switch, so that the tuning switch switches a conduction relationship between the standard port and the at least one conversion port.

7. The tuning circuit according to claim 2, wherein each group of patch units further comprises a third patch point;
a first end of the third patch point is connected to a first end of the first patch point in a same group of patch units; and
a second end of the third patch point is connected to an input feeder.

8. The tuning circuit according to claim 2, wherein conversion ports are in number of 3 or 4.

9. The tuning circuit according to claim 2, wherein conversion ports are in number same as that of the patch units.

10. The tuning circuit according to claim 2, wherein a number of conversion ports is greater than that of the patch units.

11. The tuning circuit according to claim 2, wherein the tuning circuit further comprises a first matching component, a second matching component and a third matching component;
a first end of the first matching component is connected to an input feeder, and a second end of the first matching component is connected to an input end of the antenna;
two ends of the second matching component are respectively connected with a first end of the first matching component and a ground; and
two ends of the third matching component are respectively connected with a second end of the first matching component and the ground.

12. The tuning circuit according to claim 2, wherein the tuning circuit further comprises a control chip, and the control chip is connected to the tuning switch; and
the control chip is configured to send a switching signal to the tuning switch, so that the tuning switch switches a conduction relationship between the standard port and the at least one conversion port.

13. The tuning circuit according to claim 1, wherein each group of patch units further comprises a third patch point;
a first end of the third patch point is connected to a first end of the first patch point in a same group of patch units; and
a second end of the third patch point is connected to an input feeder.

14. The tuning circuit according to claim 1, wherein conversion ports are in number of 3 or 4.

15. The tuning circuit according to claim 1, wherein conversion ports are in number same as that of the patch units.

16. The tuning circuit according to claim 1, wherein a number of conversion ports is greater than that of the patch units.

17. The tuning circuit according to claim 1, wherein the tuning circuit further comprises a first matching component, a second matching component and a third matching component;
a first end of the first matching component is connected to an input feeder, and a second end of the first matching component is connected to an input end of the antenna;
two ends of the second matching component are respectively connected with a first end of the first matching component and a ground; and
two ends of the third matching component are respectively connected with a second end of the first matching component and the ground.

18. The tuning circuit according to claim 1, wherein the tuning circuit further comprises a control chip, and the control chip is connected to the tuning switch; and
the control chip is configured to send a switching signal to the tuning switch, so that the tuning switch switches a conduction relationship between the standard port and the at least one conversion port.

19. A communication device, comprising the tuning circuit according to claim 1, wherein the tuning circuit comprises a tuning switch, a grounded patch point and at least two groups of patch units, each group of patch units comprises at least a first patch point and a second patch point, the tuning switch comprises one standard port and at least one conversion port, and each group of patch units is respectively connected to a corresponding conversion port;
a first end of the first patch point and a first end of the second patch point in a same group of patch units are connected to a same conversion port;
second ends of first patch points in different patch units are respectively connected to different contact points in an antenna;
second ends of all second patch points are connected to a ground;
two ends of the grounded patch point are respectively connected with the standard port and the ground; and
patch points in a same group of patch units cannot be in an attached state simultaneously.

20. The communication device according to claim 19, wherein each group of patch units further comprises a third patch point;
a first end of the third patch point is connected to the first end of the first patch point in a same group of patch units; and
a second end of the third patch point is connected to an input feeder.

* * * * *